W. H. PRATT.
ASTATIC WATTMETER.
APPLICATION FILED JAN. 25, 1910.
1,003,507.
Patented Sept. 19, 1911.
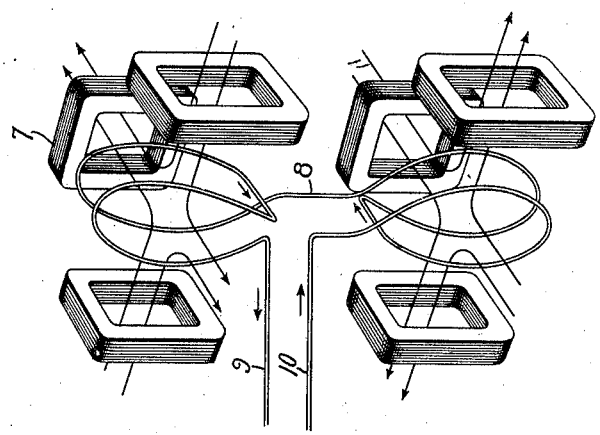
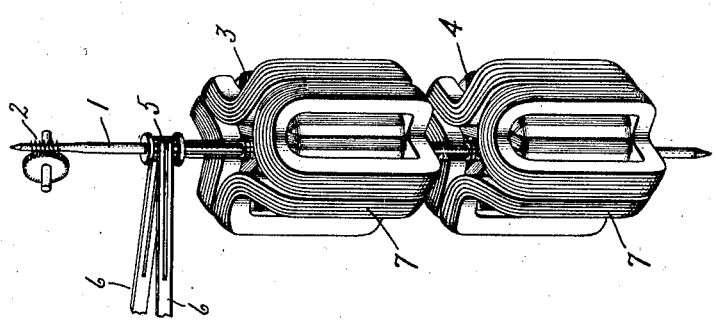
Witnesses:
George W. Tilden
J. Ellis Glen
Inventor:
William H. Pratt,
by Albert G. Davis
His Attorney.

UNITED STATES PATENT OFFICE.

WILLIAM H. PRATT, OF LYNN, MASSACHUSETTS, ASSIGNOR TO GENERAL ELECTRIC COMPANY, A CORPORATION OF NEW YORK.

ASTATIC WATTMETER.

1,003,507.

Specification of Letters Patent.  Patented Sept. 19, 1911.

Application filed January 25, 1910. Serial No. 539,915.

*To all whom it may concern:*

Be it known that I, WILLIAM H. PRATT, a citizen of the United States, residing at Lynn, in the county of Essex, State of Massachusetts, have invented certain new and useful Improvements in Astatic Wattmeters, of which the following is a specification.

My invention relates to astatic electric wattmeters, and has for its object an improvement in such devices.

Astatic meters are constructed so as to be influenced as little as possible by magnetic fields to which they may be subjected and which are extraneous to these meters. Astatic wattmeters have been constructed in the past with two armatures mounted upon the same shaft, the armatures being energized by a current varying with the potential in the circuit to be measured, and the fields in coöperative relation with these armatures energized by a current whose intensity varies with the current in the circuit to be measured. Such meters have been made with two two-pole armatures and coöperating two-pole fields, the fields being so positioned that the magnetic fluxes set up by them flow in opposite directions. Astatic wattmeters have also been constructed with a single four-pole armature in coöperative relation with a four-pole field. Wattmeters constructed in either of the above fashions are not perfectly astatic. With the increased development of the electrical art and the consequential necessity of placing meters in close proximity to electric conductors carrying large currents, and thus producing strong magnetic fields, the defects in the previous forms of these meters have become magnified.

The object of my invention then is the construction of a new form of astatic wattmeter which shall be more perfectly astatic than such meters have been in the past.

I have found that the astatic meters which consist of two two-pole armatures and their coöperating fields are not perfectly astatic with respect to horizontal conductors placed fairly near the meter. They would only be perfectly astatic with the distance between the two armatures zero. They are, however, astatic for vertical conductors placed near the meter. I have also found that meters consisting of a single four-pole armature are uninfluenced by a horizontal conductor at the level of the armature and only slightly affected by horizontal conductors in other positions with respect to the armature. These meters are, however, not perfectly astatic with respect to vertical conductors, and would only be so if the diameter of the meter armature was zero. By constructing a meter with two four-pole armatures mounted upon the same shaft and in coöperative relation with two four-pole fields, I have found that I am able to combine the good features of both forms of astatic meter described above and thereby produce a meter which is more perfectly astatic than either of the above forms, and at the expense of but a slight amount of complication of the meter structure.

For a further understanding of my invention, reference may be had to the accompanying drawings, where—

Figure 1 shows in perspective a view of the two armatures with their coöperating fields, the brushes and a portion of the registering mechanism being shown, the remaining portions of the meter mechanism being omitted; and Fig. 2 shows diagrammatically the disposition of the two armatures upon the shaft and the relation of the field fluxes, two of the field coils being omitted from the drawing for a better clearness of illustration.

Referring first to Fig. 1, 1 is a meter shaft which drives the recording mechanism in the usual manner, only the worm on the shaft and the first gear wheel of the mechanism being shown. Mounted upon this shaft are the two four-pole armatures 3 and 4, which are energized in the usual manner by a current varying with the potential in the circuit to be measured. Attached to the shaft and connected to the armatures is the commutator 5 upon which bear the brushes 6. While I have shown only a single commutator placed above the two armatures for the purposes of illustration, it is obvious that any of the well known forms of commutator construction may be used. In operative relation with the two armatures, I have shown the two sets of series fields 7, these being the usual series fields employed in an integrating wattmeter, and the coils forming the fields are shown as closely embracing the two armatures.

Fig. 2 shows diagrammatically the arrangement of the polarities of the two fields. The armature windings, for the purpose of illustration, are shown diagrammatically by the conductor 8, the small arrows showing the direction in which the current may be supposed to flow, and for clearness of illustration the terminals of the armature conductors 9 and 10 are shown as midway between the two armatures instead of being brought up to the commutator placed above the two armatures as shown in Fig. 1. The long curved arrows show the direction of the fluxes in the two fields, and it will be seen that the fields are so positioned that the directions of the fluxes of the one are opposed to the directions of the fluxes of the other. The armatures are positioned on the shaft, so that the direction of their polarities or fluxes are also opposed. The directions of the armature fluxes have not been illustrated.

While I have shown a particular embodiment of my invention, I do not limit myself to this especial embodiment, but seek in the appended claims to cover all embodiments which may be obvious to those skilled in the art and not depart from the spirit of my invention.

What I claim as new and desire to secure by Letters Patent of the United States, is,

1. In an electric wattmeter, a vertical shaft, two armatures mounted on said shaft having a plurality of pairs of poles and adapted to be energized by a current varying with the potential, two series fields in operative relation with the armatures, the armatures and their coöperating fields being so positioned that the directions of the fluxes of one armature and its field are opposed to those of the other armature and its field.

2. In an electric wattmeter, the combination of two four-pole armatures mounted on a shaft, and adapted to be energized by a current varying with the potential, and two four-pole series fields in operative relation with the armatures, the armatures and their coöperating fields being so positioned that the directions of the fluxes of one armature and its field are opposed to those of the other armature and its field.

In witness whereof, I have hereunto set my hand this twenty-first day of January, 1910.

WILLIAM H. PRATT.

Witnesses:
JOHN A. McMANUS, Jr.,
CHARLES A. BARNARD.

---

Copies of this patent may be obtained for five cents each, by addressing the "Commissioner of Patents, Washington, D. C."